Figure 1:
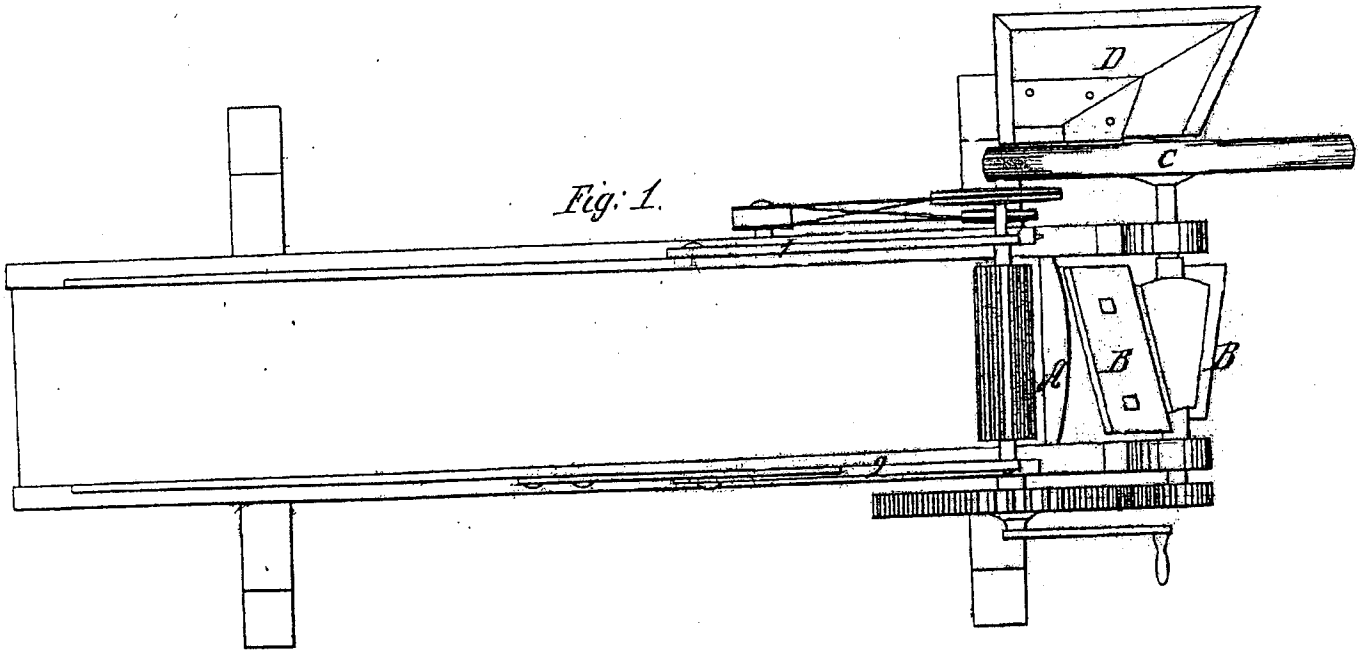
Figure 2:
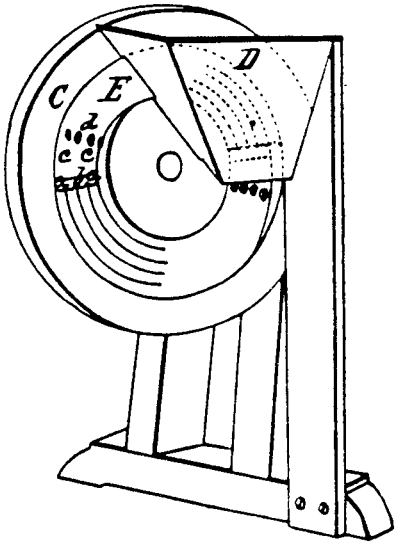

2. Sheets. Sheet. 1.

C. T. Bolts,

Straw Cutter

No. 27. (A1) Patented Oct 16. 1839.

C. T. Betts, 2. Sheets. Sheet 2.

Straw Cutter.

No. 27. (A1) Patented Oct. 16, 1839

R. PETERS, PHOTO-LITHOGRAPHER, WASHINGTON, D. C.

DEPARTMENT OF COMMERCE
UNITED STATES PATENT AND TRADEMARK OFFICE

---

MISSING PAGE(S)

PATENT NUMBER AI 27 FOR THE ISSUE DATE 10/16/1839 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims